June 30, 1970  R. MERARD  3,518,568
ELECTRICALLY ENERGIZED DEVICE FOR PUMPING CRYSTAL
LASERS HAVING THE LASER CRYSTALS WITHIN
A HOUSING CONTAINING AN IONIZABLE GAS
Filed Feb. 27, 1967  2 Sheets-Sheet 1

United States Patent Office 3,518,568
Patented June 30, 1970

3,518,568
ELECTRICALLY ENERGIZED DEVICE FOR PUMPING CRYSTAL LASERS HAVING THE LASER CRYSTALS WITHIN A HOUSING CONTAINING AN IONIZABLE GAS
René Merard, 20 Residence du Parc, 91 Massy, France
Filed Feb. 27, 1967, Ser. No. 618,622
Claims priority, application France, Mar. 11, 1966, 53,206
Int. Cl. H01s 3/09
U.S. Cl. 331—94.5      2 Claims

ABSTRACT OF THE DISCLOSURE

A crystal laser pumping device comprising a transparent enclosure which contains an ionizable gas, cavities located within said enclosure and each containing a laser crystal, an electrically conductive casing surrounding said enslosure and having the shape of a cylindrical ring, and means for releasing electric energy within said casing, said released energy having the effect of ionizing said gas and creating a plasma which is also subjected to a pinch effect.

---

This invention relates to a method of pumping crystal lasers as well as to a device for the application of said method.

Up to the present time, two methods have principally been employed for pumping crystal lasers and have utilized for this purpose the release of electric energy which is stored, for example, in a capacitor bank.

In the more common method of the two, an electric discharge is established between two electrodes immersed in a gas (usually xenon) which is contained in a quartz tube, and the light energy of the flash produced by said discharge provides optical pumping of the laser crystal. The quartz flash-tube can be of helical configuration and is adapted to surround the laser crystal.

In the other known method, electric energy is released into one or a number of metallic coil elements which closely surround an enclosure having the shape of a cylindrical ring and containing an ionizable gas, the laser crystal being housed within the inner cylinder of said ring and in coaxial relation thereto.

The disadvantage of this method lies in the fact that electromagnetic energy is permitted to radiate to the exterior and therefore to heat the chamber at the expense of the plasma which is created by the discharge.

The present invention is concerned with a method and a device which is comparable with the second method referred-to above in that an electric discharge is produced in a gas without electrodes but which is free from the disadvantages mentioned in the foregoing.

More specifically, the present invention relates to a method for crystal laser pumping of the type in which an ionizable gas is placed within a transparent enclosure which surrounds the crystal, and in which electric energy is released into a conducting circuit so as to ionize the gas and to produce a plasma which is thereby subjected to a pinch effect, said method consisting in causing the electric energy thus released to propagate along current lines having the shape of loops, the assembly of current loops thus formed being such as to constitute a surface of revolution surrounding a volume in which the enclosure containing the ionizable gas is placed.

The present invention is also concerned with a device for carrying out the method hereinabove described with a view to effecting the excitation or pumping of a crystal laser, said device comprising a transparent enclosure containing an ionizable gas, at least one cavity within said enclosure, a laser crystal housed inside each of said cavities, an electrically conductive casing surrounding said enclosure and having the shape of a cylindrical ring, a source of electric energy and means for releasing within said conductive casing the electric energy which is stored in said source, said released energy having the effect of ionizing said ags and creating a plasma which is thereby subjected to a pinch effect.

In a preferred embodiment of the device according to the invention, the enclosure in which the ionizable gas is placed has the shape of a cylindrical ring which is coaxial with that portion of the conductive casing which surrounds said enclosure and the means for releasing electric energy within said casing are constituted by a spark-gap and by an electrode of said spark-gap which is housed within the inner cylinder of said cylindrical ring, said spark-gap being intended to initiate a discharge which propagates within said electrode and throughout said casing along current lines which diverge from the inner cylinder of the ring and produce on the plasma which is thus formed a repulsion effect with respect to all the internal faces of said cylindrical ring.

In an alternative embodiment, the spark-gap is also housed within the inner cylinder of the cylindrical ring, thereby ensuring higher efficiency of the device by reason of the shorter connections which are thus made possible.

Further properties and advantages of the invention will beome apparent from the following description in which two forms of construction of the device according to the invention are given solely by way of explanation and not in any limiting sense, reference being had to the accompanying drawings, in which.

Figure 1:
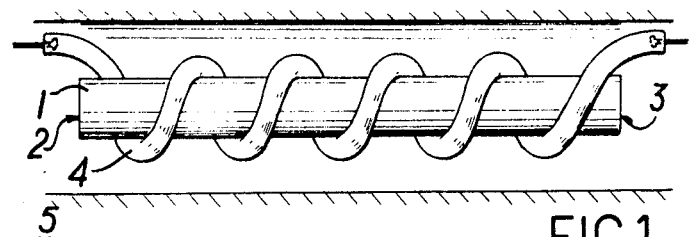
FIG. 1 shows diagrammatically a known device for crystal laser excitation or optical pumping by means of a discharge established within a helical flash-tube.

The apparatus which is illustrated in FIG. 1 and designed for the utilization of the first known method is constituted by a cylindrical ruby rod 1 having parallel end faces 2 and 3, one end face being totally reflecting whilst the other end reflects 95% of the incident radiation.

A helical flash-tube 4 illuminates the ruby and a cylindrical mirror 5 focuses the light on said ruby.

Figure 2:
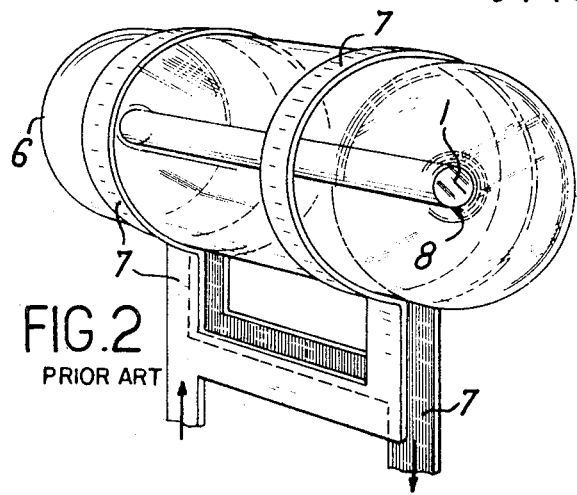
FIG. 2 shows diagrammatically in perspective a known device for crystal laser pumping by means of a gas to be ionized which surrounds the crystal within an enclosure, said enclosure having the shape of a cylindrical ring closely surrounded by a metallic coil element in which an electric discharge is established.

The apparatus which is illustrated in FIG. 2 and permits the utilization of the second known method comprises an enclosure 6 having the shape of a cylindrical ring of glass or quartz, for example, which contains the gas to be ionized. Said enclosure is closely surrounded by a coil element made up of two metallic hoops or bands such as the band 7 which are coupled in parallel and in which an electric discharge is established. The laser crystal 1 is located within the inner cylinder 8 of the enclosure 6 and in coaxial relation thereto.

In this apparatus, the pinch effect, or constriction of the plasma which is produced by the discharge, tends to move the plasma away from the peripheral inner surface of the enclosure 6. This gives rise to a disadvantage in that, on the one hand, the plasma is compressed against the wall of the inner cylinder 8 and that, on the other hand, the plasma comes into contact with both parallel end walls of the enclosure 6 (end effect), with the result that the enclosure is heated at the expense of the plasma.

A further disadvantage of the conventional apparatus shown in FIG. 2 lies in the fact that it permits the radiation of electromagnetic energy toward the exterior.

As a consequence of these different phenomena, the efficiency of the apparatus is appreciably impaired.

The apparatus which is designed for the practical application of the method according to the present invention is free from such defects.

Figure 3:
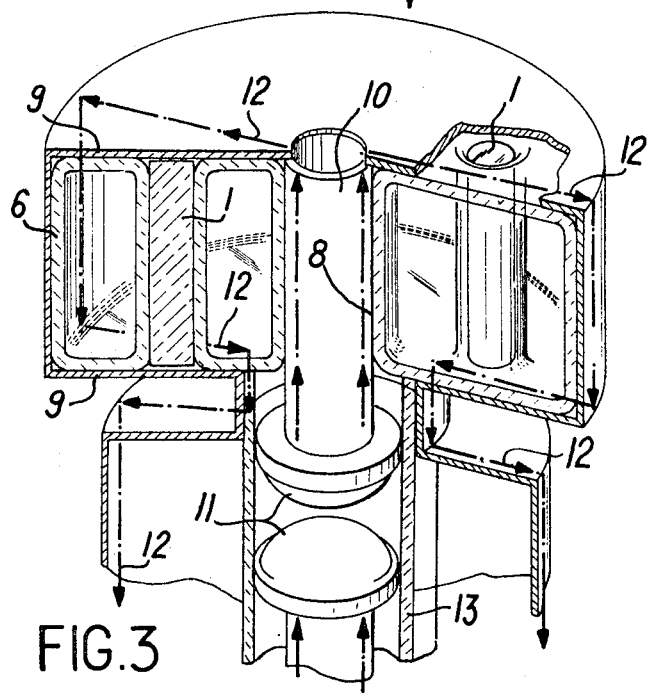
FIG. 3 shows diagrammatically and in perspective with parts broken away a first embodiment of the device according to the invention; and finally.

In this apparatus, as illustrated in FIG. 3, the cylindrical ring 6 which contains the gas to be ionized can accommodate a number of laser crystals 1 (FIG. 3 shows two such crystals). A plurality of lasers can therefore be excited at the same time, thereby increasing the overall efficiency.

The enclosure 6 is surrounded by a metallic casing 9 (for example of copper) having the same shape, said casing being coaxial with said enclosure and rigidly assembled with the electrode 10 of a spark-gap 11 which is isolated from the casing 9 by means of an insulating wall 13.

Said spark-gap 11 initiates the electric discharge which propagates within the metallic casing 9 along the current lines 12. Said current lines follow the generatrices of the inner cylinder 8 of the enclosure 6, spread out radially over its parallel faces, then follow the generatrices of the outer cylinder which forms the boundary wall of said enclosure. Thus, said electric discharge results in the formation of a plasma, on which said current lines exert a repulsion effect with respect to all the internal faces of the cylindrical ring 6. Consequently, there is no occurrence either of heating of the enclosure 6 at the expense of the plasma or of end effects.

A coaxial assembly as thus contemplated has a further advantage over the known apparatus of FIG. 2 in that there is no radiation of electromagnetic energy toward the exterior. In other words, the energy stored in the capacitor bank which supplies the discharge is wholly localized within the useful volume of the cavity which is filled with gas to be ionized. This coaxial shape permits of a high quality coefficient and therefore minimizes losses in spite of the presence of the spark-gap 11 which initiates the discharge.

The efficiency of this device according to the invention is therefore considerably greater than that of the known apparatus of FIG. 2, for a number of different reasons.

Figure 4:
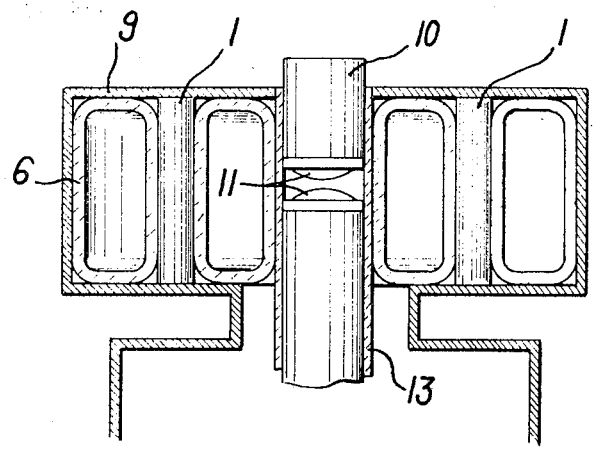
FIG. 4 shows diagrammatically and in axial cross-section a second embodiment of the device according to the invention wherein the spark-gap is located at the level of the cylindrical ring.

In the form of construction of the device according to the invention as shown in FIG. 4, the spark-gap is located at the same level as the cylindrical ring, thereby ensuring even better efficiency of the device by reason of the shorter connections which are thus made possible.

What we claim is:
1. A device for crystal laser pumping comprising a ring shaped transparent enclosure containing an ionizable gas, a central cavity passing through said enclosure, a plurality of laser crystal receiving cavities within said enclosure spaced from and parallel to said central cavity, a laser crystal in each of said last-named cavities, a cylindrical ring electrically conductive casing surrounding said enclosue, said central cavity passing through said casing, an insulating wall extending through said casing and through said central cavity, a source of electric energy and means for releasing within said conductive casing the electric energy from said source, said released energy ionizing said gas and creating a plasma subjected to a pinch effect, said means for releasing electric energy within said casing being a spark-gap, an electrode for said spark-gap within said central cavity and within said insulating wall, said spark-gap initiating a discharge which propagates within said electrode and throughout said casing along current lines which diverge from the inner cylinder of said ring and produce on the plasma thus formed a repulsion effect with respect to all the internal faces of said cylindrical ring.

2. A device as described in claim 1, said spark-gap being within said central cavity of said cylindrical ring.

References Cited

UNITED STATES PATENTS

| | | | |
|---|---|---|---|
| 3,209,281 | 9/1965 | Colgate et al. | 331—94.5 |
| 3,265,989 | 8/1966 | Gurs | 331—94.5 |
| 3,387,227 | 6/1968 | Mastrup et al. | 331—94.5 |

RONALD L. WIBERT, Primary Examiner

W. L. SIKES, Assistant Examiner